United States Patent
Shinkai et al.

(10) Patent No.: US 12,441,269 B2
(45) Date of Patent: Oct. 14, 2025

(54) AIRBAG CUSHION

(71) Applicant: Toray Industries, Inc., Tokyo (JP)

(72) Inventors: Hironori Shinkai, Otsu (JP); Atsushi Morimoto, Osaka (JP); Kazuki Hattori, Otsu (JP); Masanori Sugino, Osaka (JP); Hirotaka Ito, Osaka (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 18/842,359

(22) PCT Filed: Feb. 6, 2023

(86) PCT No.: PCT/JP2023/003841
§ 371 (c)(1),
(2) Date: Aug. 28, 2024

(87) PCT Pub. No.: WO2023/166921
PCT Pub. Date: Sep. 7, 2023

(65) Prior Publication Data
US 2025/0178559 A1    Jun. 5, 2025

(30) Foreign Application Priority Data
Mar. 4, 2022    (JP) .................. 2022-033804

(51) Int. Cl.
*B60R 21/235*    (2006.01)
*B29C 65/00*    (2006.01)
(Continued)

(52) U.S. Cl.
CPC ............ *B60R 21/235* (2013.01); *B29C 65/48* (2013.01); *B29C 65/50* (2013.01);
(Continued)

(58) Field of Classification Search
CPC ........ B60R 21/235; B60R 2021/23509; B60R 2021/23514; B60R 2021/23561;
(Continued)

(56) References Cited

U.S. PATENT DOCUMENTS

2002/0020992 A1    2/2002   Kanuma
2006/0163849 A1*   7/2006   Keshavaraj ........... B60R 21/239
                                                     280/730.2
(Continued)

FOREIGN PATENT DOCUMENTS

CN    113856986 A   * 12/2021
DE    112016003956 T5 * 5/2018   ........... B60R 21/235
(Continued)

OTHER PUBLICATIONS

International Search Report dated Apr. 25, 2023, of counterpart International Application No. PCT/JP2023/003841 along with an English translation.

*Primary Examiner* — Keith J Frisby
(74) *Attorney, Agent, or Firm* — DLA Piper LLP (US)

(57) ABSTRACT

An airbag cushion has a plurality of base fabrics and adhesive joints for bonding each of the plurality of base fabrics, wherein the adhesive joint includes a sealing adhesive, a tensile strength (S1) between the base fabric and the adhesive joint is 500 N/5 cm or more, and an application width (L1) and an application thickness (L2) of the adhesive joint satisfy inequality (1):

$$L1 \times L2 \leq 50 \text{ mm}^2. \quad (1)$$

10 Claims, 3 Drawing Sheets

(51) Int. Cl.
*B29C 65/48* (2006.01)
*B29C 65/50* (2006.01)
*D06C 7/02* (2006.01)
*D06N 3/00* (2006.01)
*B29L 22/02* (2006.01)

(52) U.S. Cl.
CPC ...... *B29C 65/5042* (2013.01); *B29C 65/5057* (2013.01); *B29C 66/439* (2013.01); *D06C 7/02* (2013.01); *D06N 3/0077* (2013.01); *B29L 2022/027* (2013.01); *B60R 2021/23509* (2013.01); *B60R 2021/2358* (2013.01); *D06N 2211/268* (2013.01); *D10B 2505/124* (2013.01)

(58) Field of Classification Search
CPC .. B60R 2021/23571; B60R 2021/2358; B60R 2021/23595; B60R 2021/23533; D06C 7/00; D06C 7/02; D06N 3/0077; D06N 2211/268; D10B 2505/124; B29C 66/729; B29C 66/7292; B29C 66/43; B29C 66/439; B29C 65/48; B29C 65/50; B29C 65/5042; B29C 65/5057; B29C 65/8215; B29C 65/8223; B29L 2022/027
USPC ............................................ 280/728.1, 743.1
See application file for complete search history.

(56) References Cited

U.S. PATENT DOCUMENTS

| | | | |
|---|---|---|---|
| 2006/0163853 A1* | 7/2006 | Keshavaraj | B60R 21/235 280/730.2 |
| 2007/0281564 A1* | 12/2007 | Mizushima | C08L 83/04 442/164 |
| 2009/0179410 A1* | 7/2009 | Schindzielorz | B32B 37/1207 156/182 |
| 2010/0015407 A1* | 1/2010 | Be | B60R 21/235 156/291 |
| 2010/0109305 A1* | 5/2010 | Miyata | B60R 21/235 280/743.1 |
| 2011/0181031 A1 | 7/2011 | Wipasuramonton et al. | |
| 2013/0280444 A1* | 10/2013 | Kim | B60R 21/232 428/12 |
| 2013/0292930 A1 | 11/2013 | Wipasuramonton et al. | |
| 2016/0207492 A1* | 7/2016 | Akechi | D06N 3/0006 |
| 2018/0251095 A1* | 9/2018 | Kim | B60R 21/23138 |
| 2021/0246312 A1* | 8/2021 | Thiria | B32B 7/09 |

FOREIGN PATENT DOCUMENTS

| | | | | |
|---|---|---|---|---|
| EP | 2 311 692 A1 | | 4/2011 | |
| EP | 3498542 A1 | * | 6/2019 | ....... B60R 21/23138 |
| JP | 2003-72504 A | | 3/2003 | |
| JP | 2006159990 A | * | 6/2006 | |
| JP | 2006291396 A | * | 10/2006 | |
| JP | 2007-38693 A | | 2/2007 | |
| JP | 2008013752 A | * | 1/2008 | ............ C08L 83/00 |
| JP | 2008156798 A | * | 7/2008 | |
| JP | 2009179150 A | * | 8/2009 | |
| JP | 2009202683 A | * | 9/2009 | |
| JP | 2009214728 A | * | 9/2009 | |
| JP | 2009220675 A | * | 10/2009 | |
| JP | 2009255677 A | * | 11/2009 | |
| JP | 2010006244 A | * | 1/2010 | |
| JP | 2010018241 A | * | 1/2010 | |
| JP | 2010189865 A | * | 9/2010 | |
| JP | 2011-152913 A | | 8/2011 | |
| JP | 2015-515942 A | | 6/2015 | |
| JP | WO2019065880 A1 | * | 9/2020 | |
| JP | WO2020153446 A1 | * | 11/2021 | |
| WO | WO-2019167820 A1 | * | 9/2019 | ........... B60R 21/235 |

* cited by examiner

AIRBAG CUSHION

CROSS-REFERENCE TO RELATED APPLICATIONS

This application is a US national stage filing under 35 U.S.C. § 371 of International Application No. PCT/JP2023/003841, filed Feb. 6, 2023, which claims priority to Japanese Patent Application No. 2022-033804, filed Mar. 4, 2022, each of which is incorporated herein by reference in its entirety.

TECHNICAL FIELD

This disclosure relates to an airbag cushion. In more detail, the disclosure relates to an airbag cushion that is easy to be produced, is lightweight, and has excellent storability and internal pressure retaining performance.

BACKGROUND

Conventionally, with increasing awareness of traffic safety, various airbags have been developed for securing the safety of passengers in the event of a car accident. Airbags expand and deploy inside a vehicle in an extremely short time upon vehicle crash, thereby receiving passengers who are moving in reaction to the crash and absorbing the impact to protect the passengers. JP 2011-152913 A discloses an airbag having a seam-free joint structure with an adhesive.

When not in use, an airbag is stored in a predetermined location within a vehicle. To secure a wide space in the vehicle, the airbag is required to have excellent storability and light weight property. Moreover, the airbag is preferably manufactured by a simple method. However, the airbag described in JP 2011-152913 A is not sufficient in terms of light weight property and storability.

It could therefore be helpful to provide an airbag cushion that is easy to be produced, is lightweight, and has excellent storability and internal pressure retaining performance.

SUMMARY

We found that the above-described problems can be solved by an airbag cushion in which a plurality of base fabrics are bonded via adhesive joints with sealing adhesives, each of the adhesive joints is adjusted to have a predetermined dimension, and a tensile strength between the base fabric and the adhesive joint is adjusted.

Disclosed herein is an airbag cushion having a plurality of base fabrics and adhesive joints for bonding each of the plurality of base fabrics, wherein the adhesive joint includes a sealing adhesive, a tensile strength (S1) between the base fabric and the adhesive joint is 500 N/5 cm or more, and an application width (L1) and an application thickness (L2) of the adhesive joint satisfy inequality (1):

$$L1 \times L2 \leq 50 \text{ mm}^2. \tag{1}$$

REFERENCE SIGNS LIST

1 Airbag cushion
21 First base fabric
21a First resin layer
22 Second base fabric
22a Second resin layer
23 Third base fabric
23a Third resin layer
3 Adhesive joint
31 First adhesive joint
32 Second adhesive joint
A1 Direction of stress applied to adhesive joint during deployment
A2 Direction to which shear stress is applied
R1 End region on diagonal side of base fabric

DETAILED DESCRIPTION

Airbag Cushion

Our airbag cushion has a plurality of base fabrics and adhesive joints for bonding each of the plurality of base fabrics. The adhesive joint includes a sealing adhesive. A tensile strength (S1) between the base fabric and the adhesive joint is 500 N/5 cm or more. An application width (L1) and an application thickness (L2) of the adhesive joint satisfy inequality (1). Each component will be described below.

$$L1 \times L2 \leq 50 \text{ mm}^2 \tag{1}$$

Base Fabric

The base fabric used for the airbag cushion may be any base fabric that has been conventionally and generally used in airbag applications. For example, the base fabric consists of synthetic fibers. The synthetic fibers are not particularly limited. By way of an example, the synthetic fibers are synthetic fibers and the like composed of a polyamide fiber such as nylon 6.6, nylon 6, nylon 12, nylon 4.6, and a copolymer of nylon 6 with nylon 6.6, a copolymer of nylon 6 with polyalkylene glycol, dicarboxylic acid, amine, or the like, homopolyester of polyethylene terephthalate, polybutylene terephthalate, or the like, a polyester fiber obtained by copolymerizing an acid component constituting a polyester repeating unit with an aliphatic dicarboxylic acid such as isophthalic acid, 5-sodium sulfoisophthalic acid, or adipic acid, an aramid fiber represented by a copolymer of para-phenylene terephthalic aramid with aromatic ether, a rayon fiber, a polysulfone fiber, an ultra-high molecular weight polyethylene fiber, and a polymer array fiber having a sea-island structure mainly composed of the above-described synthetic fibers. Among them, the synthetic fiber is preferably a polyamide fiber or a polyethylene terephthalate fiber, more preferably a polyamide fiber such as nylon 6.6 and nylon 6, in terms of impact resistance.

The synthetic fiber is preferably a multifilament. A fineness (total fineness) of the synthetic fibers is not particularly limited. By way of an example, the fineness of the synthetic fibers is preferably 150 dtex or more, and more preferably 235 dtex or more. Moreover, the fineness of the synthetic fibers is preferably 600 dtex or less, and more preferably 500 dtex or less. When the total fineness is within the above-described ranges, an airbag cushion to be obtained is lightweight and compact, and required mechanical properties (tensile strength, tear strength, and the like) are easily obtained. The total fineness of the synthetic fibers can be calculated based on JIS L 1013 (2010) 8.3.1 A method.

A single fiber fineness of the synthetic fiber is preferably 1 dtex or more, and more preferably 2 dtex or more. Moreover, the single fiber fineness of the synthetic fiber is preferably 10 dtex or less, and more preferably 8 dtex or less. When the single fiber fineness of the synthetic fiber is within the above-described ranges, the synthetic fiber is easy to be produced. Moreover, the synthetic fiber improves in flexibility of a warp yarn and a weft yarn to be obtained and easily improves in compactness of an airbag to be obtained. In particular, when the single fiber fineness of the synthetic fiber is within the above-described preferred ranges, an air gap occupied between single fibers in a fiber layer to be obtained (particularly in a case of a woven fabric) easily becomes small. Therefore, the degree of adhesion between the warp yarn and the weft yarn can be increased, and resistance to slippage can be improved. The single fiber fineness of synthetic fiber can be calculated by dividing a total fineness by the number of filaments. Moreover, the number of filaments can be calculated based on the method of JIS L 1013 (2010) 8.4.

A cross-sectional shape of the single fiber of the synthetic fiber is not particularly limited. By way of an example, the cross-sectional shape of the single fiber may be circular, may be any of various non-circular shapes such as Y shape, V shape, and flat shape, or may be of a hollow portion. Among them, the cross-sectional shape of the single fiber is preferably circular from the viewpoint of spinnability.

A tensile strength of the synthetic fiber is preferably 8.0 cN/dtex or more, and more preferably 8.3 cN/dtex or more. Moreover, the tensile strength of the synthetic fiber is preferably 9.0 cN/dtex or less. When the tensile strength is within the above-described ranges, a base fabric to be obtained easily obtains sufficient mechanical properties (tensile strength, tear strength, and the like). The tensile strength of the synthetic fiber can be calculated by measuring under the constant rate of extension condition shown in JIS L 1013 (2010) 8.5.1 standard time test.

An elongation of the synthetic fiber is preferably 15% or more, and more preferably 18% or more. Moreover, the elongation of the synthetic fiber is preferably 30% or less, and more preferably 28% or less. When the elongation of the synthetic fiber is within the above-described ranges, a fiber layer to be obtained (particularly in a case of a woven fabric) has excellent toughness and work load at break. In addition, the synthetic fiber can improve in spinnability and weaving performance. The elongation of the synthetic fiber can be calculated based on an elongation at a point showing the maximum strength in an S—S curve obtained when calculating the above-described tensile strength.

In the synthetic fiber, additives such as a heat stabilizer, an antioxidant, a light stabilizer, a smoothing agent, an antistatic agent, a plasticizer, a thickener, a pigment, and a flame retardant may be compounded as appropriate to improve productivity in spinning, stretching, and processing steps or improve characteristics of a base fabric to be obtained.

Referring back to the general description of the base fabric, a cover factor (CF) of the base fabric is preferably 1900 or more. Moreover, the cover factor (CF) of the base fabric is preferably 2,500 or less. When the cover factor of the base fabric is within the above-described ranges, the base fabric easily achieves both compactness and air barrier performance. The cover factor (CF) of the base fabric is a value calculated from a total fineness and a weave density of yarn used as a warp or weft yarn and is defined by equation (a). In equation (a), Dw is a total warp fineness (dtex), Df is a total weft fineness (dtex), Nw is a weave density of a warp yarn (yarn/2.54 cm), and Nf is a weave density of a weft yarn (yarn/2.54 cm).

$$CF = (Dw \times 0.9)^{1/2} \times Nw + (Df \times 0.9)^{1/2} \times Nf \qquad (a)$$

A configuration of the base fabric is not particularly limited. By way of an example, the base fabric may be any of a woven, knitted, or non-woven fabric, for example, a mixed knitted or woven fabric. Among them, the base fabric is preferably a woven fabric from the viewpoint of ensuring airtightness.

A texture of the woven fabric is preferably a three-basic texture such as a plain weave, a twill weave, and a satin weave, a varied texture such as a ripstop weave, a varied plain weave, a varied twill weave, and a varied satin weave, a special texture such as a honeycomb weave, a mock leno weave and a crape weave, a single backed texture such as a warp backed weave and a weft backed weave, a warp pile texture such as a reversible figured double weave, a hollow weave, a double velvet, a towel, a seal, and a velour, a weft pile texture such as a velveteen, a weft velvet, a velvet, and a corduroy, a leno texture such as a silk gauze, a plain gauze, and a brocade gauze, or the like. Moreover, weaving is preferably performed with a shuttle loom (such as a fly shuttle loom), a shuttleless loom (such as a rapier loom, a gripper loom, a water jet loom, and an air jet loom), or the like. Among them, the texture of the woven fabric is more preferably a plain weave, when it is used for an airbag, from the viewpoint of particularly excellent mechanical properties and thin fabric.

A type of the knitted fabric may be a weft knitted fabric or a warp knitted fabric. Weft knitting is preferably plain knitting, rib knitting, double knitting, purl knitting, tuck knitting, floating knitting, one rib knitting, lace knitting, or pile knitting, and warp knitting is preferably single denbigh knitting, single atlas knitting, double cord knitting, half tricot knitting, fleecy knitting, jacquard knitting, or the like. Moreover, knitting is preferably performed by a circular knitting machine, a flat knitting machine, a flat type knitting machine like a cotton type knitting machine, a tricot knitting machine, a Raschel knitting machine, a Milanese knitting machine, or the like.

The base fabric is preferably a coated base fabric having at least one surface coated with resin. By providing the airbag cushion with a resin layer formed by being coated with resin, the airbag cushion easily maintains a more excellent tensile strength with the coated resin and the sealing adhesive being chemically bonded.

Moreover, by providing the resin layer, a coated base fabric to be obtained is imparted with air barrier performance. Furthermore, even if a high-temperature gas is generated from an inflator when the airbag is deployed, the coated base fabric provided with the resin layer is easily protected from heat.

A method of forming a resin layer is not particularly limited. By way of an example, the resin layer is formed by a method of applying a resin solution constituting the resin layer to at least one surface of a base fabric, by a method of immersing a base fabric in a resin solution constituting the resin layer, by a method of separately preparing a resin film constituting the resin layer and laminating it on a base fabric, a lamination method, a fusion bond method, a transfer method, or the like.

A type of a resin constituting a resin layer is not particularly limited. By way of an example, the resin is a polyamide-based resin, a polyurethane resin, a silicone resin, or the like. Among them, a base fabric is preferably laminated with a polyurethane resin or a silicone resin. A coated base fabric thus obtained obtains more excellent light weight property, cold resistance, flame retardancy, air barrier performance, etc., and also easily maintains an excellent tensile strength.

Examples of the silicone resin include a dimethyl-based silicone resin, a methyl vinyl-based silicone resin, a methyl phenyl-based silicone resin, a fluoro-based silicone resin, and the like.

Examples of the polyurethane resin include a polycarbonate-based polyurethane, a polyether-based polyurethane, a polyester-based polyurethane, a polyether-ester-based polyurethane, and the like.

The resin constituting the resin layer may comprise a flame retardant compound. Examples of the flame retardant compound include a halogen compound comprising bromine, chlorine, and the like. Specifically, the flame retardant compound is a halogenated cycloalkane, a platinum compound, an antimony oxide, a copper oxide, a titanium oxide, a phosphorus compound, a thiourea-based compound, carbon, cerium, silicon oxide, or the like.

A viscosity of resin (a resin solution), when applied to a base fabric, is preferably 5,000 to 20,000 mPa·s so that a stable and constant amount is easily applied to the base fabric. The resin may be of a solvent-free type that originally exhibits such a viscosity or of a solvent type that is appropriately diluted with a solvent to achieve such a viscosity. The viscosity of the resin can be measured under an environment at 20° C. using a B-type viscometer based on JIS Z 8803 (2011). Moreover, when a resin layer is formed by a lamination method, examples of the lamination method include an extrusion lamination method, a thermal (heat) lamination method, a dry lamination method, and the like. The extrusion lamination method can simultaneously perform extrusion molding of a resin film (a resin layer) and lamination of the resin film (the resin layer) and a base fabric, so that a production efficiency of a coated base fabric can be improved. The thermal lamination method is a method of laminating a resin film and a base fabric by thermal adhesion with a thermo-compression roller and is preferably applied when both the base fabric and the resin film are polyamide resins, etc. The dry lamination method is a method of bonding a base fabric and a resin film with an adhesive (including a tackiness agent, and the same applies hereinafter), and as the adhesive, a two-liquid type urethane-based adhesive, a one-liquid type urethane-based adhesive, an epoxy-based adhesive, or the like can be used.

An amount of resin (a resin solution), applied to a base fabric, is preferably 5 g/m$^2$ or more, and more preferably 10 g/m$^2$ or more. Moreover, the amount of resin applied is preferably 30 g/m$^2$ or less, and more preferably 25 g/m$^2$ or less. When the amount of resin applied is within the above-described ranges, a coated base fabric to be obtained has a sufficient air barrier performance and an excellent storability. Moreover, the airbag cushion easily maintains a more excellent tensile strength with the resin layer and the sealing adhesive being chemically bonded.

On the other hand, when the base fabric is covered with a resin film, a thickness of the resin film is preferably 5 μm or more, and more preferably 10 μm or more. Moreover, the thickness of the resin film is preferably 50 μm or less, and more preferably 25 μm or less. When the thickness of the resin film is within the above-described ranges, a coated base fabric to be obtained is lightweight and has an excellent airtightness.

Adhesive Joint

The airbag cushion has adhesive joints for bonding each of a plurality of base fabrics. The adhesive joint includes a sealing adhesive.

The adhesive joint may or may not comprise a sewn part in which a plurality of base fabrics are sewn together with sewing threads. When the airbag cushion does not comprise a sewn part, an adhesive joint bonded with only a sealable adhesive is formed in the plurality of base fabrics. Even in such a case, the airbag cushion exhibits an excellent tensile strength of 500 N/5 cm or more. As a result, the airbag cushion is also easily produced since, in the manufacturing process, a sewing step with sewing threads is eliminated. Moreover, by eliminating the sewing step, an amount of carbon dioxide emitted during manufacturing of the airbag cushion can be reduced. Furthermore, with the airbag cushion not having any sewn part made of sewing threads, it is lighter and more compact and has an excellent storability compared with an airbag cushion having a sewn part.

Examples of the sealing adhesive include, for example, rubbers such as a halogen-containing rubber such as a chloroprene rubber, a Hypalon rubber, and a fluororubber, a silicone rubber, an ethylene-propylene rubber, an ethylene-propylene-terpolymer rubber, a nitrile-butadiene rubber, a styrene-butadiene rubber, an isobutylene-isoprene rubber, a urethane rubber, and an acrylic rubber, and resins such as a halogen-containing resin such as a vinyl chloride resin, a vinylidene chloride resin, a chlorinated polyolefin resin, and a fluororesin, a urethane resin, an acrylic resin, an ester resin, an amide resin, an olefin resin, and a silicone resin. Among them, the sealing adhesives are preferably a silicone rubber and a silicone resin because of their excellent flexibility, heat resistance, and weather resistance.

The sealing adhesive can contain various additives, as necessary, such as a curing agent for crosslinking and curing, a catalyst for promoting a curing reaction, a filler for the purposes of reinforcement, viscosity adjustment, improving heat resistance, and improving flame retardancy, an adhesion-imparting agent for improving adhesiveness to a base fabric, a curing inhibitor, an organopolysiloxane resin, a pigment, and a heat resistance agent.

The sealing adhesive may have a strong adhesiveness to resin (a coat resin) to be applied to one side of a base fabric which will be described later. In particular, when the sealing resin and the coat resin have similar components, the sealing adhesive has improved compatibility at an interface with the coat resin, resulting in a good adhesiveness. Moreover, when the sealing adhesive and the coat resin have the same components, the airbag cushion is easy to be controlled in quality and is advantageous in terms of economy. Having the similar components means, for example, a case where, when the coat resin is a silicone rubber-based resin, the sealing adhesive is also a silicone-based adhesive, and a case where, when the coat resin is a urethane-based resin, the sealing adhesive is also a urethane-based adhesive.

An aspect of bonding a plurality of base fabrics through adhesive joints is not particularly limited. By way of an example, the aspect of bonding the plurality of base fabrics may be (i) an aspect of directly bonding a plurality of base fabrics to each other (also referred to as "peel bonding"), or (ii) an aspect of bonding a plurality of base fabrics using a third base fabric (also referred to as "shear bonding").

Figure 1:
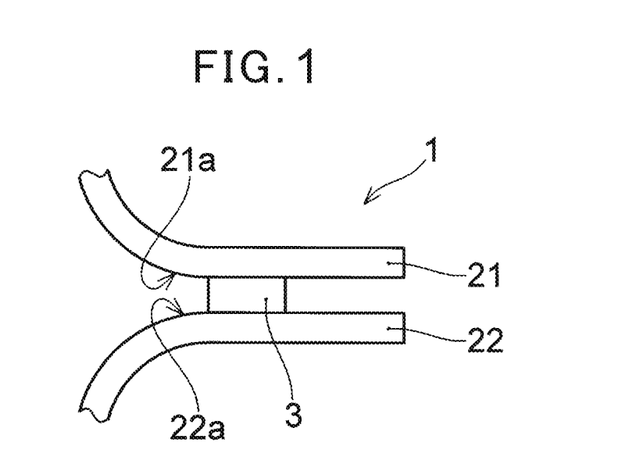
FIG. 1 is a schematic cross-sectional view of an airbag cushion, in a case where a plurality of base fabrics are directly bonded to each other.

FIG. 1 is a schematic cross-sectional view of an airbag cushion 1 where a plurality of base fabrics are directly bonded to each other. The plurality of base fabrics (a first base fabric 21 and a second base fabric 22) are each provided with a resin layer (a first resin layer 21a and a second resin layer 22a) on a surface thereof. The ends of the first base fabric 21 and the second base fabric 22 are folded so that the first resin layer 21a and the second resin layer 22a face each other.

The adhesive joint 3 is bonded to the first resin layer 21a and the second resin layer 21a. The first base fabric 21 and the second base fabric 22 are thereby bonded through the adhesive joint 3.

Figure 2:
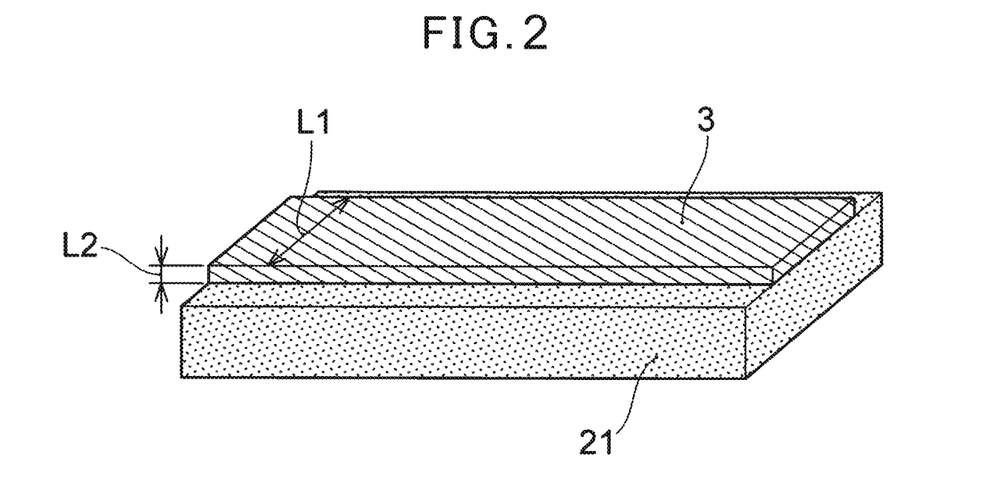
FIG. 2 is a schematic cross-sectional view for explaining adhesive joints in base fabrics.

FIG. 2 is a schematic cross-sectional view for explaining adhesive joints in base fabrics. The adhesive joint is provided to have a long rectangular shape in a plan view to bond the ends of the plurality of base fabrics (only one of the base fabrics (the first base fabric 21) is illustrated in FIG. 2).

An application width (L1) of an adhesive joint refers to a length in a direction substantially perpendicular to a longitudinal direction of an adhesive joint 3 when viewed in plan. In a case of peel bonding, the application width (L1) of the adhesive joint is preferably 7 mm or more, and more preferably 10 mm or more. Moreover, the application width (L1) of the adhesive joint is preferably 20 mm or less, and more preferably 15 mm or less. When the application width (L1) of the adhesive joint is within the above-described ranges, the airbag cushion has a plurality of base fabrics easily bonded appropriately to each other and easily exhibits an excellent tensile strength.

On the other hand, an application thickness (L2) is a length in a thickness direction of a base fabric. In the case of peel bonding, the application thickness (L2) of the adhesive joint is preferably 0.5 mm or more, and more preferably 1.0 mm or more. Moreover, the application thickness (L2) of the adhesive joint is preferably 3.0 mm or less, and more preferably 2.0 mm or less. When the application thickness (L2) of the adhesive joint is within the above-described ranges, the airbag cushion has a plurality of base fabrics easily bonded appropriately to each other and easily exhibits an excellent tensile strength.

An application width (L1) and an application thickness (L2) of the adhesive joint satisfy inequality (1).

$$L1 \times L2 \leq 50 \text{ mm}^2 \quad (1)$$

A value of L1×L2 may be 50 mm² or less, preferably 30 mm² or less, and more preferably 20 mm² or less. Moreover, the value of L1×L2 is preferably 1.0 mm² or more, and more preferably 3.0 mm² or more. When the value of L1×L2 is greater than 50 mm², there is a problem that storability of the airbag cushion becomes poor.

(ii) Aspect of Bonding a Plurality of Base Fabrics Using a Third Base Fabric (Also Referred to as "Shear Bonding")

Figure 3:
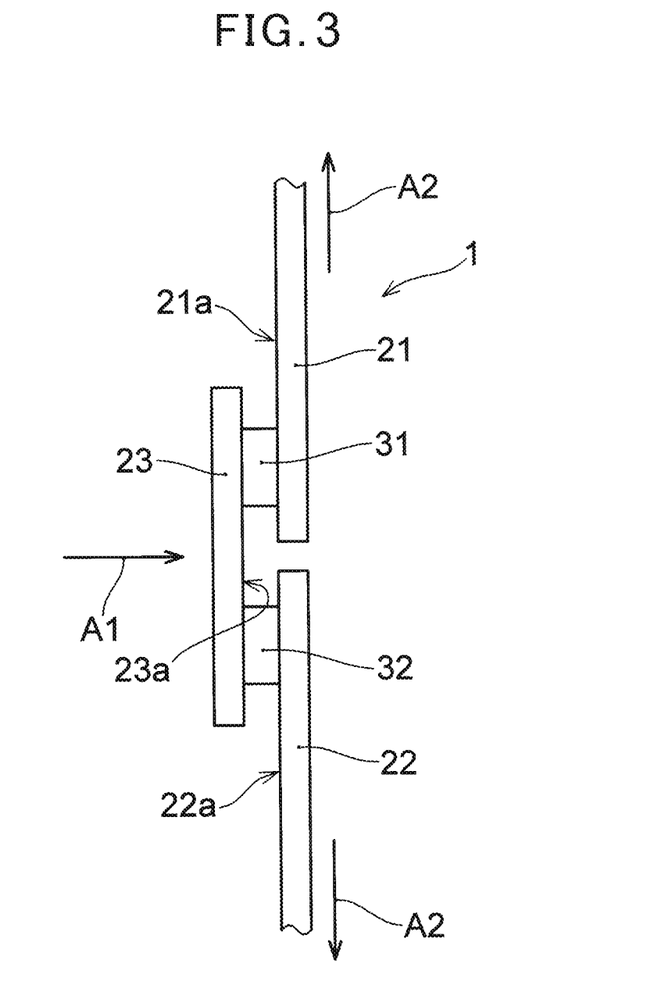
FIG. 3 is a schematic cross-sectional view of an airbag cushion, in a case where a plurality of base fabrics are bonded using a base fabric for bonding (a third base fabric).

FIG. 3 is a schematic cross-sectional view of an airbag cushion 1 in a case of bonding a plurality of base fabrics (a first base fabric 21 and a second base fabric 22) using a third base fabric 23. The plurality of base fabrics (a first base fabric 21 and a second base fabric 22) are each provided with a resin layer (a first resin layer 21a and a second resin layer 22a) on a surface thereof.

A configuration of the third base fabric 23 is not particularly limited. By way of an example, as the third base fabric 23, a base fabric similar to the base fabrics described above in relation to the first base fabric 21 and the second base fabric 22 can be used.

As shown in FIG. 3, the first base fabric 21 and the second base fabric 22 are arranged side by side without their respective ends overlapping each other. The first base fabric 21 and the second base fabric 22 are bonded to the third base fabric 23 through adhesive joints (a first adhesive joint 31 and a second adhesive joint 32). Like the first base fabric 21 and the second base fabric 22, the third base fabric 23 is preferably a coated base fabric with a resin layer 23a provided on one side thereof. Thereby, in the first base fabric 21 and the second base fabric 22, their respective resin layers (the first resin layer 21a and the second resin layer 22a) are bonded to the resin layer of the third base fabric 23 (the third resin layer 23a) through the adhesive joints (the first adhesive joint 31 and the second adhesive joint 32). As a result, an airbag cushion 1 to be obtained exhibits a more excellent tensile strength.

In a case of shear bonding, an application width (L1) of the first adhesive joint 31 is preferably 10 mm or more, and more preferably 15 mm or more. Moreover, the application width (L1) of the first adhesive joint 31 is preferably 30 mm or less, and more preferably 20 mm or less. When the application width (L1) of the first adhesive joint 31 is within the above-described ranges, the airbag cushion 1 has a plurality of base fabrics easily bonded appropriately to each other and easily exhibits an excellent tensile strength.

In the case of shear bonding, an application thickness (L2) of the first adhesive joint 31 is preferably 0.2 mm or more, and more preferably 0.5 mm or more. Moreover, the application thickness (L2) of the first adhesive joint 31 is preferably 3.0 mm or less, and more preferably 2.0 mm or less. When the application thickness (L2) of the first adhesive joint 31 is within the above-described ranges, the airbag cushion 1 has a plurality of base fabrics easily bonded appropriately to each other through the third base fabric 23 and easily exhibits an excellent tensile strength.

An application width and an application thickness of the second adhesive joint 32 may adopt ranges similar to those of the first adhesive joint 31.

The application width (L1) and the application thickness (L2) of the adhesive joint satisfy inequality (1). In the case of shear bonding, the application width (L1) and the application thickness (L2) in inequality (1) equals a sum of a value of L1×L2 in the first adhesive joint 31 and a value of L1×L2 in the second adhesive joint 32.

$$L1 \times L2 \leq 50 \text{ mm}^2 \quad (1)$$

The value of L1×L2 may be 50 mm² or less, preferably 30 mm² or less, and more preferably 20 mm² or less. Moreover, the value of L1×L2 is preferably 1.0 mm² or more, and more preferably 3.0 mm² or more. When the value of L1×L2 is greater than 50 mm², there is a problem that storability of the airbag cushion becomes poor.

As shown in FIG. 3, in the airbag cushion, a plurality of base fabrics are bonded by shear bonding, so that, when the airbag cushion is deployed, a direction (A1) of stress applied to an adhesive joint can be a direction perpendicular to a lamination direction of the third base fabric 23, the first adhesive joint 31, and the first base fabric 21, and a lamination direction of the third base fabric 23, the second adhesive joint 32, and the second base fabric 22 (i.e., a direction to which shear stress is applied (A2)). As a result, the airbag cushion 1 easily maintains an excellent tensile strength even when a small amount of a sealing adhesive is used in an adhesive joint or when a thickness of the adhesive joint is small. Moreover, this reduces the material cost of the airbag cushion 1 and improves storability. Furthermore, by reducing the amount of the sealing adhesive used, carbon dioxide emissions in the airbag cushion 1 can also be reduced.

Referring back to the general description of the airbag cushion, the airbag cushion has a tensile strength (S1) between a base fabric and an adhesive joint of 500 N/5 cm or more. The tensile strength (S1) is preferably 550 N/5 cm or more, and more preferably 600 N/5 cm or more. When the tensile strength (S1) is less than 500 N/5 cm, adhesion between base fabrics in the airbag cushion is easily peeled off when the airbag cushion is deployed.

The tensile strength can be calculated by preparing a test piece (50 mm in width, 150 mm or more in total length) in which a plurality of base fabrics are bonded in the form shown in FIG. 1 or FIG. 3 or cutting a test piece out of an airbag cushion and measuring a strength at which the test piece breaks with a length between grips of 100 mm and a tensile speed of 200 mm/min using a constant-speed tension-type testing machine.

In the airbag cushion, for example, even if it is stored for a long period of time, a tensile strength between a base fabric and an adhesive joint is unlikely to decrease. Specifically, when the airbag cushion is subjected to a dry heat treatment for 408 hours under a condition of a temperature at 105° C., a tensile strength (S2) between a base fabric and an adhesive joint after the dry heat treatment can satisfy inequality (2).

$$S2 \geq S1 \times 0.9 \quad (2)$$

The tensile strength (S2) is preferably 0.9 times or more, and more preferably 1.0 times or more of S1. As such, the airbag cushion can maintain a stable performance over a long period of time.

Moreover, when the airbag cushion is subjected to a humidity heat treatment for 408 hours under a condition of a temperature at 70° C. and a humidity of 95% RH, a tensile strength (S3) between a base fabric and an adhesive joint after the humidity heat treatment can satisfy inequality (3).

$$S3 \geq S1 \times 1.0 \quad (3)$$

The tensile strength (S3) is preferably 1.0 times or more, and more preferably 1.1 times or more of S1. As such, the airbag cushion can maintain a stable performance over a long period of time. In particular, in a conventional airbag cushion, a tensile strength tends to decrease due to a long-term storage or the like. However, the airbag cushion is expected to have an aging effect of a sealing adhesive due to the long-term storage or the like and can have improved retention rate of a tensile strength.

A basis weight of the base fabric is preferably 270 g/m² or less, and more preferably 250 g/m² or less. When the basis weight of the base fabric is within the above-described ranges, the base fabric is lighter and has an excellent storability.

The base fabric may be composed of a plurality of layers. The base fabric thereby has an excellent airtightness. Moreover, the base fabric easily improves in physical properties such as adhesiveness and cut resistance.

Method of Manufacturing Base Fabric and Airbag Cushion

A method of manufacturing a base fabric is not particularly limited. By way of an example, when the base fabric is a woven fabric, a warp yarn is first warped and installed on a loom. Similarly, a weft yarn is installed on the loom. The loom is not particularly limited. Examples of the loom include a water jet loom, an air jet loom, a rapier loom, and the like. Among them, a water jet loom is preferable as the loom, from the viewpoints that it is relatively easy for high-speed weaving and productivity can be easily improved. Both the warp yarn and the weft yarn are preferably of the same type of synthetic fibers (e.g., polyamide fibers). Moreover, both the warp yarn and weft yarn are preferably woven to have the same weave density. The term "the same type of synthetic fibers" means fibers having equivalent polymer type, total fineness, and physical properties. Moreover, the term "the same weave density" means that a difference in weave density between a warp yarn and a weft yarn after weaving is within 1.5 yarns. The weave density can be calculated based on JIS L 1096:2010 8.6.1.

A weaving tension is preferably low from the viewpoint of improving quality. Moreover, the closer the crimp percentages of warp and weft becomes, the higher the tear strength becomes and the more the slip resistance can be suppressed. An airbag cushion obtained using this woven fabric has an excellent cut resistance, has a large slip resistance, and is less subjected to air leakage.

A method of adjusting a tension of a warp yarn is not particularly limited. By way of an example, the tension of the warp yarn can be adjusted by a method of adjusting a speed of feeding the warp yarn in a loom, a method of adjusting a speed of beating up a weft yarn, or the like. Whether the tension of the warp yarn is within the above-described range can be confirmed, for example, by measuring, with a tension measuring instrument, a tension applied to each warp yarn in a warp beam and a central part of a back roller during operation of a loom.

After weaving, the obtained woven fabric is subjected to processing such as refining and heat setting as necessary. In the refining step, for example, the woven fabric is charged in a plurality of tanks and washed with water. At that time, a refining agent (e.g., a nonionic surfactant or an anionic surfactant) is appropriately compounded. A water temperature in each tank is suitably about 40 to 70° C. The refining agent is thereby activated, and an oil solution, wax, and the like adhering to a weaving yarn can be efficiently removed. In the heat setting step, a dryer is used. Examples of the dryer include a hot air dryer, a suction drum dryer, a non-touch dryer, and the like.

Next, the woven fabric can be provided with a resin layer by applying resin to at least one side. A method of applying resin is not particularly limited. By way of an example, it is preferable to apply resin by a knife coating method since it suppresses an amount of resin applied and allows for a stable application. Moreover, resin is preferably applied by lamination. The knife coating method includes a knife-over-roll method, a knife-over-belt method, a floating knife method, and the like. Among them, resin is more preferably applied by a floating knife method since it easily suppresses an amount of resin applied and easily makes resin to penetrate into a woven fabric. In the knife coating method, a tension of a base fabric is preferably adjusted to 500 to 3000 N/m. Moreover, a contact pressure with a knife is preferably adjusted to 1 to 15 N/cm. When the tension of the base fabric and the contact pressure with the knife are within the above-described ranges, the woven fabric can be fixed in a state where a bundle of yarns are deformed by the coating. As a result, a base fabric (a coated base fabric) to be obtained has minimized impregnation of resin into the woven fabric and can improve in flexibility and compactness. When resin is applied by lamination, examples of the lamination method include, for example, an extrusion lamination method, a thermal (heat) lamination method, a dry lamination method, and the like. The extrusion lamination method can simultaneously perform extrusion molding of a resin film and lamination of the resin film and a base fabric, so that a production efficiency can be improved. Moreover, the thermal (heat) lamination method is a method of feeding a pre-molded resin film and a base fabric and laminating them between a thermo-compression roller and a rubber pressing roller by thermal adhesion, which can increase a processing speed compared with the extrusion lamination method and can improve the production efficiency in terms of processing speed. The dry lamination method is a method of bonding a resin film and a base fabric with an adhesive, which can laminate resin films that are not suitable for thermal adhesion. A coated base fabric obtained by applying resin by a lamination method has an advantage that a resin layer has a uniform thickness.

The obtained base fabric is composed mainly of fibers and optional resin and is lightweight.

A method of manufacturing an airbag cushion from the base fabric obtained by the above-described manufacturing method is not particularly limited. By way of an example, the airbag cushion is manufactured by cutting a base fabric according to a cutting pattern. A plurality of cut base fabrics can be manufactured by being bonded into a bag and attaching an accessory such as an inflator to it. As described above, in an adhesive joint, a sewn part may be formed with sewing threads, or the adhesive joint may be configured to consist of a sealing adhesive without forming any sewn part. A method of imparting a sealing adhesive to a cut base fabric is not particularly limited. By way of an example, when the sealing adhesive is in a liquid form, the sealing adhesive can be imparted to the cut base fabric by a dispenser, screen printing, spraying, or the like. When the sealing adhesive is in a powder form, a method of imparting the sealing adhesive to the cut base fabric through a molding flask, etc. can be adopted. When the sealing adhesive is in a form of a film or tape, a method of cutting the sealing adhesive into a desired shape and attaching it to the cut base fabric, etc. can be adopted. Among them, it is preferable that the sealing adhesive is in a liquid form and a method of applying the sealing adhesive to the cut base fabric by a dispenser is adopted, from the viewpoint of precise control of an application width and an application thickness.

An airbag cushion to be obtained can be used in airbags for a driver's seat, passenger's seat, and back seat, airbags for side, knee, and ceiling, and the like. The airbag cushion has an excellent internal pressure retaining performance after deployment. Therefore, the airbag cushion is suitable for applications requiring a consistent inflation time, particularly for a curtain airbag, a side airbag, and the like.

Figure 4:
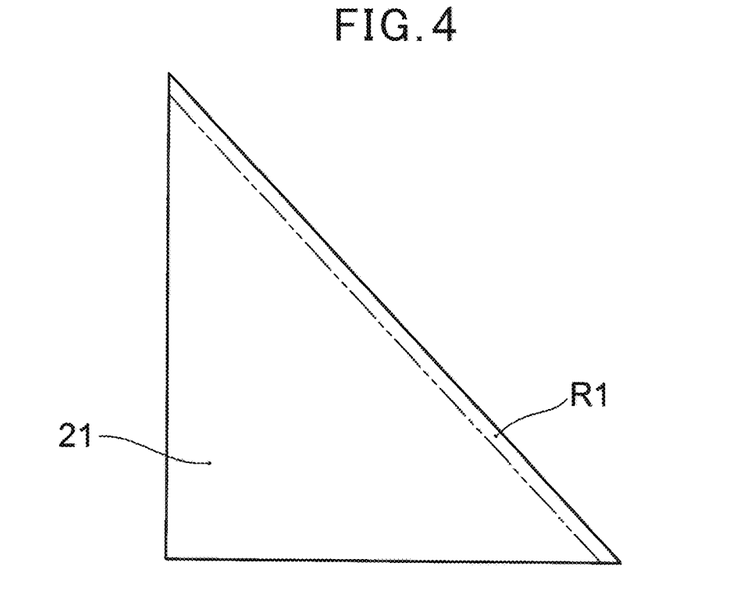
FIG. 4 is a schematic view for explaining a method of measuring packability of an airbag cushion.
Figure 5:
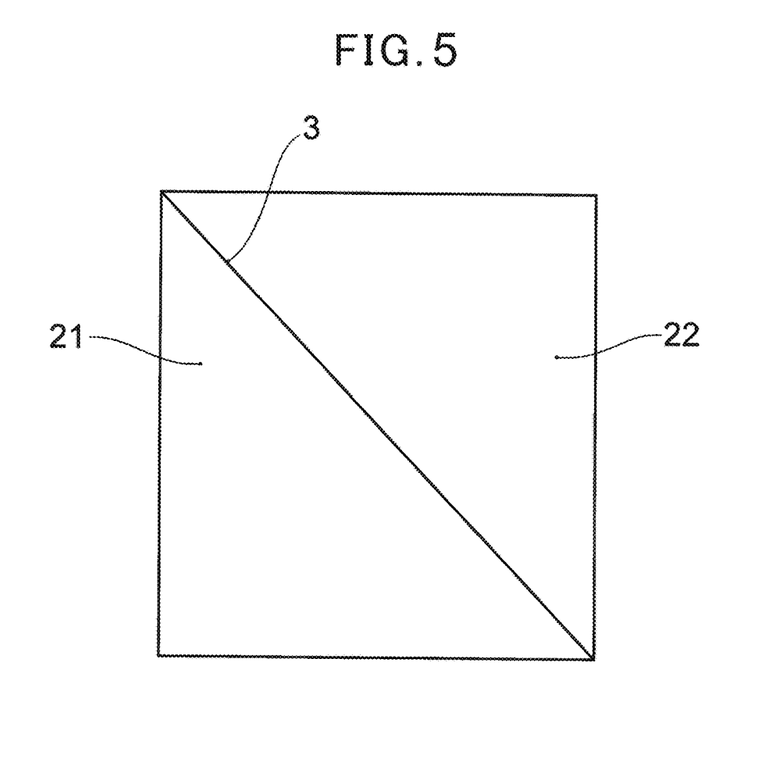
FIG. 5 is a schematic view for explaining a method of measuring packability of an airbag cushion.

Moreover, the airbag cushion has an excellent storability. FIGS. 4 and 5 are schematic views for explaining a method of measuring packability of an airbag cushion. As shown in FIG. 4, in the airbag cushion, two pieces of base fabric for an airbag having a substantially right-angled triangular shape (836.5 mm in length×784.2 mm in width) are prepared, and sealing adhesives are applied to end regions R1 on diagonal sides of respective base fabrics to join them. A rectangular sample (800 mm long×750 mm wide) shown in FIG. 5 is thereby obtained. A packability value of the obtained sample is measured in accordance with ASTM D-6478-10. The packability value is preferably 3000 cm·sup·3 or less, and more preferably 2800 cm·sup·3 or less. When the packability value is within the above-described ranges, the airbag cushion has an excellent storability. Therefore, when the airbag cushion is not in use, it is easily stored in a predetermined place inside a vehicle, so that a large space inside the vehicle can be secured.

One embodiment has been described above. This disclosure is not particularly limited to the above-described embodiments. The above-described embodiments mainly describe an airbag cushion having the following configurations.

(1) An airbag cushion having a plurality of base fabrics and adhesive joints for bonding each of the plurality of base fabrics, wherein the adhesive joint includes a sealing adhesive, a tensile strength (S1) between the base fabric and the adhesive joint is 500 N/5 cm or more, and an application width (L1) and an application thickness (L2) of the adhesive joint satisfy inequality (1):

$$L1 \times L2 \leq 50 \text{ mm}^2. \tag{1}$$

According to such a configuration, in the airbag cushion, the plurality of base fabrics are bonded to each other by the adhesive joints comprising the sealing adhesive. Therefore, the airbag cushion is easily produced since it is not essential to provide a sewn part with, for example, sewing threads, in the adhesive joints. Moreover, since it is not essential to provide a sewn part with, for example, sewing threads, the airbag cushion is lightweight and has an excellent storability. Furthermore, the airbag cushion has an excellent internal pressure retaining performance.

(2) The airbag cushion of (1), wherein the adhesive joint does not include a sewn part in which the plurality of base fabrics are sewn together with sewing threads.

According to such a configuration, the airbag cushion is easily produced because no sewn part is provided with sewing threads in the adhesive joints. Moreover, since the airbag cushion is not provided with a sewn part, it is lightweight and has an excellent storability.

(3) The airbag cushion of (1) or (2), wherein, when a dry heat treatment is performed for 408 hours under a condition of a temperature at 105° C., a tensile strength (S2) between the base fabric and the adhesive joint after the dry heat treatment satisfies inequality (2):

$$S2 \geq S1 \times 0.9. \tag{2}$$

According to such a configuration, the airbag cushion maintains a stable performance over a long period of time.

(4) The airbag cushion of (1) or (2), wherein, when a humidity heat treatment is performed for 408 hours under a condition of a temperature at 70° C. and a humidity of 95% RH, a tensile strength (S3) between the base fabric and the adhesive joint after the humidity heat treatment satisfies inequality (3):

$$S3 \geq S1 \times 1.0. \qquad (3)$$

According to such a configuration, the airbag cushion maintains a stable performance over a long period of time. In particular, although, in the conventional airbag cushion, a tensile strength tends to decrease due to a long-term storage or the like, our airbag cushion is expected to have an aging effect of a sealing adhesive due to the long-term storage or the like and can have improved retention rate of a tensile strength.

(5) The airbag cushion of any one of (1) to (4), wherein the plurality of base fabrics include a first base fabric, a second base fabric, and a third base fabric connecting the first base fabric and the second base fabric, the third base fabric and one surface of the first base fabric are bonded by a first adhesive joint including the sealing adhesive, and the third base fabric and one surface of the second base fabric are bonded by a second adhesive joint including the sealing adhesive.

According to such a configuration, when the airbag cushion is deployed, in the airbag cushion, a direction of stress applied to an adhesive joint can be a direction perpendicular to a lamination direction of the third base fabric, the first adhesive joint, and the first base fabric, and a lamination direction of the third base fabric, the second adhesive joint, and the second base fabric. As a result, the airbag cushion easily maintains an excellent tensile strength even when a small amount of a sealing adhesive is used in an adhesive joint or when a thickness of the adhesive joint is small. Moreover, this reduces the material cost of the airbag cushion and improves storability. Furthermore, by reducing the amount of the sealing adhesive used, carbon dioxide emissions in the airbag cushion can also be reduced.

(6) The airbag cushion of any one of (1) to (5), wherein a packability value measured in accordance with ASTM D-6478-10 is 3000 cm$^3$ or less.

According to such a configuration, the airbag cushion has an excellent storability.

(7) The airbag cushion of any one of (1) to (6), wherein the plurality of base fabrics are coated base fabrics each having at least one surface coated with resin.

According to such a configuration, the airbag cushion easily maintains a more excellent tensile strength with the coated resin and the sealing adhesive being chemically bonded.

EXAMPLE

Hereinafter, our airbag cushions will be described in more detail with reference to Examples. This disclosure is not limited to these Examples. Unless otherwise specified, "%" means "% by mass", and "part" means "part by mass".

Example 1

Warp Yarn, Weft Yarn

As each of a warp yarn and a weft yarn, an untwisted synthetic fiber filament was prepared which consists of nylon 66, has a circular cross section, is composed of fiber 136 filaments with a single fiber fineness of 3.5 dtex, has a total fineness of 470 dtex, has a tensile strength of 8.5 cN/dtex, and has an elongation of 23.5%.

Warping and Beamer Step

Using the above-described warp yarn, a warp beam was produced with a warping sheet tension of 40 g/yarn using a warper and with a beamer sheet tension of 75 g/yarn using a beamer.

Weaving Step

Using the above-described warp beam and the above-described weft yarn, a plain weave fabric with a weave density of 51 yarns/2.54 cm of the warp yarn and a weave density of 51 yarns/2.54 cm of the weft yarn was woven using a water jet loom. At that time, the tension of the warp yarn was adjusted to 100 g/yarn.

Refining and Heat Setting

Next, the obtained base fabric was refined at 65° C. and subjected to heat setting at 120° C. to 180° C. for 1 minute using a pin tenter dryer under a dimensional restriction with a narrowing rate of 0% and an overfeed rate of 0%.

Coating Step

Next, this woven fabric was coated with a solvent-free silicone resin having a viscosity of 50 Pa·s to have a coating amount of 15 g/m·sup·2 on the surface using a floating knife coater, and then vulcanized at 190° C. for 1 minute to obtain base fabrics for an airbag (a first base fabric, a second base fabric, and a third base fabric).

Cushioning Step

The above-described base fabric for an airbag was cut into a shape of an airbag for a driver's seat with @570 mm, and two panels (a first base fabric and a second base fabric) were cut out. A resin solution of a sealing adhesive (a solvent-free silicone resin having viscosity before mixing two liquids for Liquid A: 190 Pa·Math·s and Liquid B: 200 Pa·Math·s) was applied to the obtained first base fabric and second base fabric to bring them into aspects of shear bonding shown in FIG. 3. Specifically, a third base fabric (400 mm in width, 1750 mm in length) was prepared, two adhesive joints (a first adhesive joint and a second adhesive joint) were formed on a coated surface where a resin layer, of the obtained first base fabric and second base fabric, was formed so that a dimension after curing was 10 mm in width and 0.2 mm in thickness, and the third base fabric was bonded with the first base fabric and second base fabric to produce an airbag cushion. The sealing adhesive was applied to have a central part of an application width of 20 mm from the end of the panel. Moreover, as a bonding condition, base fabrics were laminated together and pressed with a press machine, followed by heating in an oven at 100° C. for 10 seconds and left to stand at a normal temperature for 1 day to be cured.

Examples 2 to 4

Each airbag cushion was produced in the same method as in Example 1, except that the formulation was changed to those shown in Table 1.

Example 5

A base fabric for an airbag was obtained in the same method as in Example 1, except that the formulation was changed to that shown in Table 1 for the steps up to the coating step.

Cushioning Step

The base fabric for an airbag was cut into a shape of an airbag for a driver's seat with Φ570 mm, and two panels (a first base fabric and a second base fabric) were cut out. A resin solution of a sealing adhesive (a solvent-free silicone resin having viscosity before mixing two liquids for Liquid A: 190 Pa·Math·s and Liquid B: 200 Pa·Math·s) was applied to the obtained first base fabric and second base fabric to bring them into aspects of peel bonding shown in FIG. 1. Specifically, an adhesive joint was formed on a coated surface where a resin layer of any one of the first base fabric or the second base fabric was formed so that a dimension after curing was 10 mm in width and 1.5 mm in thickness, and the other base fabric where no adhesive joint was formed was bonded to the coated surface where the resin layer was formed to produce an airbag cushion. The sealing adhesive was applied to have a central part of an application width of 20 mm from the end of the panel. Moreover, as a bonding condition, base fabrics were laminated together and pressed with a press machine, followed by heating in an oven at 100° C. for 10 seconds and left to stand at a normal temperature for 1 day to be cured.

Example 6

A base fabric for an airbag was obtained in the same method as in Example 1, except that the formulation was changed to that shown in Table 1 for the steps up to the coating step.
Cushioning Step The base fabric for an airbag was cut into a shape of an airbag for a driver's seat with Ø570 mm, and two panels (a first base fabric and a second base fabric) were cut out. A resin solution of a sealing adhesive (a solvent-free silicone resin having viscosity before mixing two liquids for Liquid A: 190 Pa·Math·s and Liquid B: 200 Pa·Math·s) was applied to the obtained first base fabric and second base fabric to bring them into aspects of peel bonding shown in FIG. 1. Specifically, an adhesive joint was formed on a coated surface where a resin layer of any one of the first base fabric or the second base fabric was formed so that a dimension after curing was 10 mm in width and 1.0 mm in thickness, and the other base fabric where no adhesive joint was formed was bonded to the coated surface where the resin layer was formed. The sealing adhesive was applied to have a central part of an application width of 20 mm from the end of the panel. Moreover, as a bonding condition, base fabrics were laminated together and pressed with a press machine, followed by heating in an oven at 100° C. for 10 seconds and left to stand at a normal temperature for 1 day to be cured. Then, a central part of the adhesive joint in a width direction was sewn with nylon 66 sewing threads having 1400 dtex using a sewing machine by a lock stitch with 4.0/cm of needle handling counts to produce an airbag cushion.

Comparative Examples 1 to 3

Each airbag cushion was produced in the same method as in Example 1, except that the formulation was changed to those shown in Table 1.

For the base fabrics and airbag cushions obtained in Examples 1 to 6 and Comparative examples 1 to 3, a tensile strength between a base fabric and an adhesive joint, a retention rate of a tensile strength after a dry heat test, a retention rate of a tensile strength after a humidity heat test, storability, and an additive performance were evaluated by the following evaluation methods. The results are shown in Table 1.
Tensile Strength (S1) Between Base Fabric and Adhesive Joint A test piece (50 mm in width, 150 mm or more in total length) in which a plurality of base fabrics are bonded in the form described in FIG. 1 (peal) or FIG. 3 (shear) was prepared, or a test piece was cut out of an airbag cushion, and a strength at which the test piece breaks with a length between grips of 100 mm and a tensile speed of 200 mm/min was measured using a constant-speed tension-type testing machine.
Retention Rate of Tensile Strength after Dry Heat Test Each base fabric was subjected to a dry heat test under a condition of a temperature at 105° C. for 408 hours. According to the evaluation method for the tensile strength (S1) between the base fabric and the adhesive joint, a tensile strength (S1) before a dry heat test and a tensile strength (S2) after the dry heat test were calculated, and a ratio (a retention rate) of the tensile strength S2 after the dry heat test to the tensile strength S1 before the dry heat test was calculated.
Retention Rate of Tensile Strength after Humidity Heat Test Each base fabric was subjected to a humidity heat treatment under a condition of a temperature of 70° C. and of a humidity of 95% RH for 408 hours. According to the evaluation method for the tensile strength (S1) between the base fabric and the adhesive joint, a tensile strength (S1) before a humidity heat test and a tensile strength (S3) after the humidity heat test were calculated, and a ratio (a retention rate) of the tensile strength S3 after the humidity heat test to the tensile strength S1 before the humidity heat test was calculated.
Packability (Storability)

Two pieces of base fabric for an airbag (836.5 mm×784.2 mm) having a right-angled triangle shape shown in FIG. 4 were prepared, each base fabric was joined with a bonding margin (an end region R1) of 25 mm, and a value of packability (storability) was measured according to ASTM D-6478-10 except that a rectangular sample (800 mm×750 mm) shown in FIG. 5 was used.
Weight of Airbag Cushion A mass of the produced airbag cushion was measured using an electronic balance.
Deployment Performance A pyrotechnic inflator (which has a tank pressure of 190 kPa and is manufactured by Daicel Corporation), together with a fixing bracket, were fixed to an inflator insertion part of an airbag, an airbag cushion was deployed at a room temperature, and, after the deployment, an airbag joint was evaluated for presence or absence of its damage.
Evaluation Criteria
- ○: The airbag cushion deployed without any puncture or bursting at the joint.
- x: The airbag cushion either had a puncture or bursting at the joint.

TABLE 1

|  |  | Unit | Example 1 | Example 2 | Example 3 | Example 4 | Example 5 | Example 6 |
|---|---|---|---|---|---|---|---|---|
| Total fineness | | dtex | 470 | 470 | 470 | 470 | 470 | 470 |
| Number of filaments | | filament | 136 | 136 | 136 | 136 | 136 | 136 |
| Density of woven fabric | Warp | yarn/2.54 cm | 51 | 51 | 51 | 50 | 50 | 51 |
| | Weft | yarn/2.54 cm | 51 | 51 | 51 | 50 | 50 | 51 |
| Coating weight | | g/m$^2$ | 15 | 15 | 15 | 25 | 25 | 15 |
| Bonding form between sealing agent and base fabric | | — | Shear | Shear | Shear | Shear | Peel | Peel |
| Application width (L1) of adhesive joint | | mm | 10 × 2 spots | 15 × 2 spots | 10 × 2 spots | 10 × 2 spots | 10 | 10 |
| Application thickness (L2) of adhesive joint | | mm | 0.2 | 0.2 | 1.0 | 0.2 | 1.5 | 1.0 |

TABLE 1-continued

| | Unit | | | | | | |
|---|---|---|---|---|---|---|---|
| L1 × L2 | mm² | 4.0 | 6.0 | 20.0 | 4.0 | 15.0 | 10.0 |
| Presence or absence of sawn part | — | Absence | Absence | Absence | Absence | Absence | Presence |
| Tensile strength (S1) | N/5 cm | 664 | 766 | 667 | 731 | 523 | 1394 |
| Tensile strength (S2) after dry heat test | N | 684 | 830 | 700 | 738 | 518 | 1352 |
| Retention rate of tensile strength before and after dry heat test | % | 103 | 108 | 105 | 101 | 99 | 97 |
| Tensile strength (S3) after humidity heat test | N | 777 | 902 | 727 | 841 | 560 | 1366 |
| Retention rate of tensile strength before and after humidity heat test | % | 117 | 118 | 109 | 115 | 107 | 98 |
| Packability (Storability) | cm³ | 2352 | 2443 | 2781 | 2451 | 2985 | 2527 |
| Weight of airbag cushion | g | 210 | 222 | 276 | 218 | 255 | 250 |
| Deployment performance | — | ○ | ○ | ○ | ○ | ○ | ○ |

| | Unit | Comparative example 1 | Comparative example 2 | Comparative example 3 |
|---|---|---|---|---|
| Total fineness | dtex | 470 | 470 | 470 |
| Number of filaments | filament | 136 | 136 | 136 |
| Density of woven fabric Warp | yarn/2.54 cm | 51 | 51 | 51 |
| Weft | yarn/2.54 cm | 51 | 51 | 51 |
| Coating weight | g/m² | 15 | 15 | 15 |
| Bonding form between sealing agent and base fabric | — | Shear | Peel | Peel |
| Application width (L1) of adhesive joint | mm | 5 × 2 spots | 20 | 10 |
| Application thickness (L2) of adhesive joint | mm | 0.1 | 3.0 | 1.0 |
| L1 × L2 | mm² | 1.0 | 60.0 | 10.0 |
| Presence or absence of sawn part | — | Absence | Absence | Absence |
| Tensile strength (S1) | N/5 cm | 301 | 1015 | 293 |
| Tensile strength (S2) after dry heat test | N | 307 | 1126 | 305 |
| Retention rate of tensile strength before and after dry heat test | % | 102 | 111 | 104 |
| Tensile strength (S3) after humidity heat test | N | 322 | 1238 | 325 |
| Retention rate of tensile strength before and after humidity heat test | % | 107 | 122 | 111 |
| Packability (Storability) | cm³ | 2249 | 4621 | 2257 |
| Weight of airbag cushion | g | 198 | 462 | 236 |
| Deployment performance | — | x | ○ | x |

As described in Table 1, all of the base fabrics and airbag cushions in Examples 1 to 6 exhibited an excellent tensile strength, as well as a small packability value, and an excellent deployment performance. On the other hand, the base fabrics and airbag cushions in Comparative examples 1 and 3, in which a tensile strength between a base fabric and an adhesive joint was less than 500 N/5 cm, had a low tensile strength and a poor deployment performance. The base fabric and airbag cushion in Comparative example 2, in which a product of an application width and an application thickness of an adhesive joint (L1×L2) exceeded 50 mm², had a large packability value.

What is claimed is:

1. An airbag cushion having a plurality of base fabrics and adhesive joints for bonding each of the plurality of base fabrics,
wherein each adhesive joint includes a sealing adhesive, a tensile strength (S1) between the base fabric and the adhesive joint is 500 N/5 cm or more, and
an application width (L1) and an application thickness (L2) of the adhesive joint satisfy inequality (1):

$$L1 \times L2 \leq 50 mm^2, \quad (1)$$

wherein the plurality of base fabrics include a first base fabric, a second base fabric, and a third base fabric connecting the first base fabric and the second base fabric,
the third base fabric and one surface of the first base fabric are bonded by a first adhesive joint comprising the sealing adhesive, and
the third base fabric and one surface of the second base fabric are bonded by a second adhesive joint comprising the sealing adhesive,
the first base fabric and the second base fabric are arranged side by side without their respective ends overlapping each other.

2. The airbag cushion of claim 1, wherein each adhesive joint does not comprise a sewn part in which the plurality of base fabrics are sewn together with sewing threads.

3. The airbag cushion of claim 2, wherein, when a dry heat treatment is performed for 408 hours under a condition of a temperature at 105° C., a tensile strength (S2) between the base fabric and each adhesive joint after the dry heat treatment satisfies inequality (2):

$$S2 \geq S1 \times 0.9. \quad (2)$$

4. The airbag cushion of claim 2, wherein, when a humidity heat treatment is performed for 408 hours under a condition of a temperature at 70° C. and a humidity of 95% RH, a tensile strength (S3) between the base fabric and each adhesive joint after the humidity heat treatment satisfies inequality (3):

$$S3 \geq S1 \times 1.0. \quad (3)$$

5. The airbag cushion of claim 2, wherein a packability value measured in accordance with ASTM D-6478-10 is 3000 cm³ or less.

6. The airbag cushion of claim 2, wherein the plurality of base fabrics are coated base fabrics each having at least one surface coated with resin.

7. The airbag cushion of claim 1, wherein, when a dry heat treatment is performed for 408 hours under a condition of a temperature at 105° C., a tensile strength (S2) between the base fabric and each adhesive joint after the dry heat treatment satisfies inequality (2):

$$S2 \geq S1 \times 0.9. \qquad (2)$$

8. The airbag cushion of claim 1, wherein, when a humidity heat treatment is performed for 408 hours under a condition of a temperature at 70° C. and a humidity of 95% RH, a tensile strength (S3) between the base fabric and each adhesive joint after the humidity heat treatment satisfies inequality (3):

$$S3 \geq S1 \times 1.0. \qquad (3)$$

9. The airbag cushion of claim 1, wherein a packability value measured in accordance with ASTM D-6478-10 is 3000 cm³ or less.

10. The airbag cushion of claim 1, wherein the plurality of base fabrics are coated base fabrics each having at least one surface coated with resin.

* * * * *